UNITED STATES PATENT OFFICE.

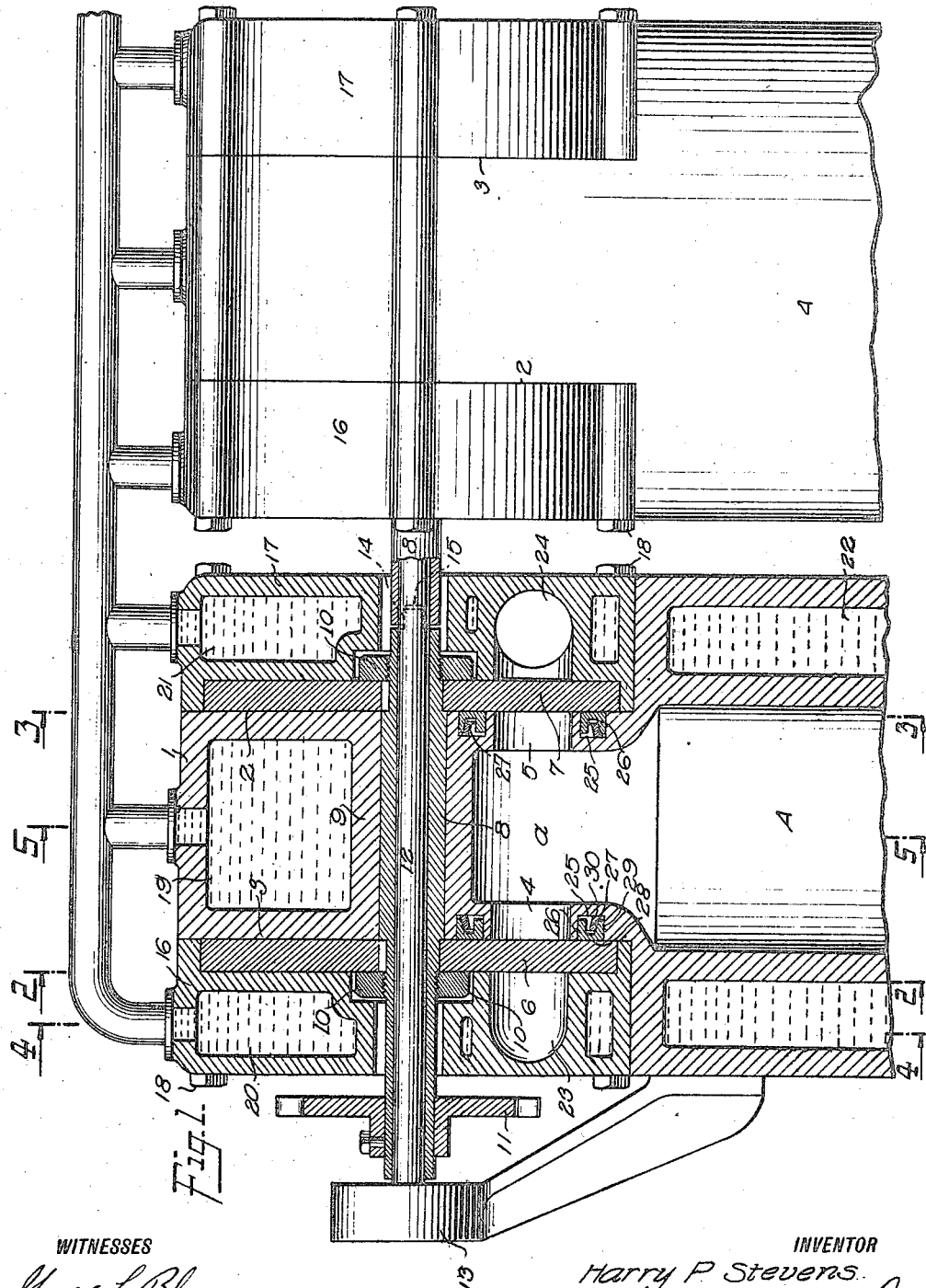

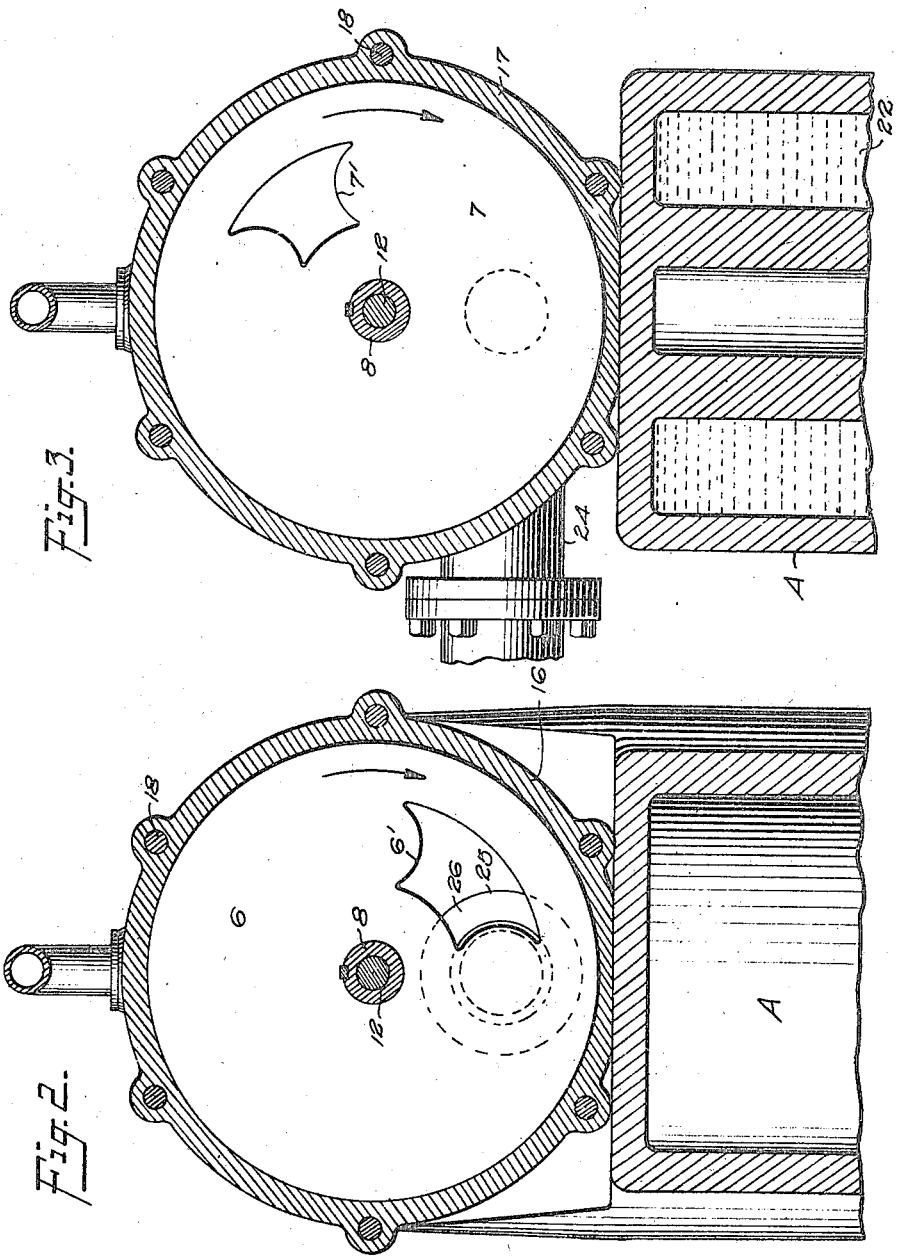

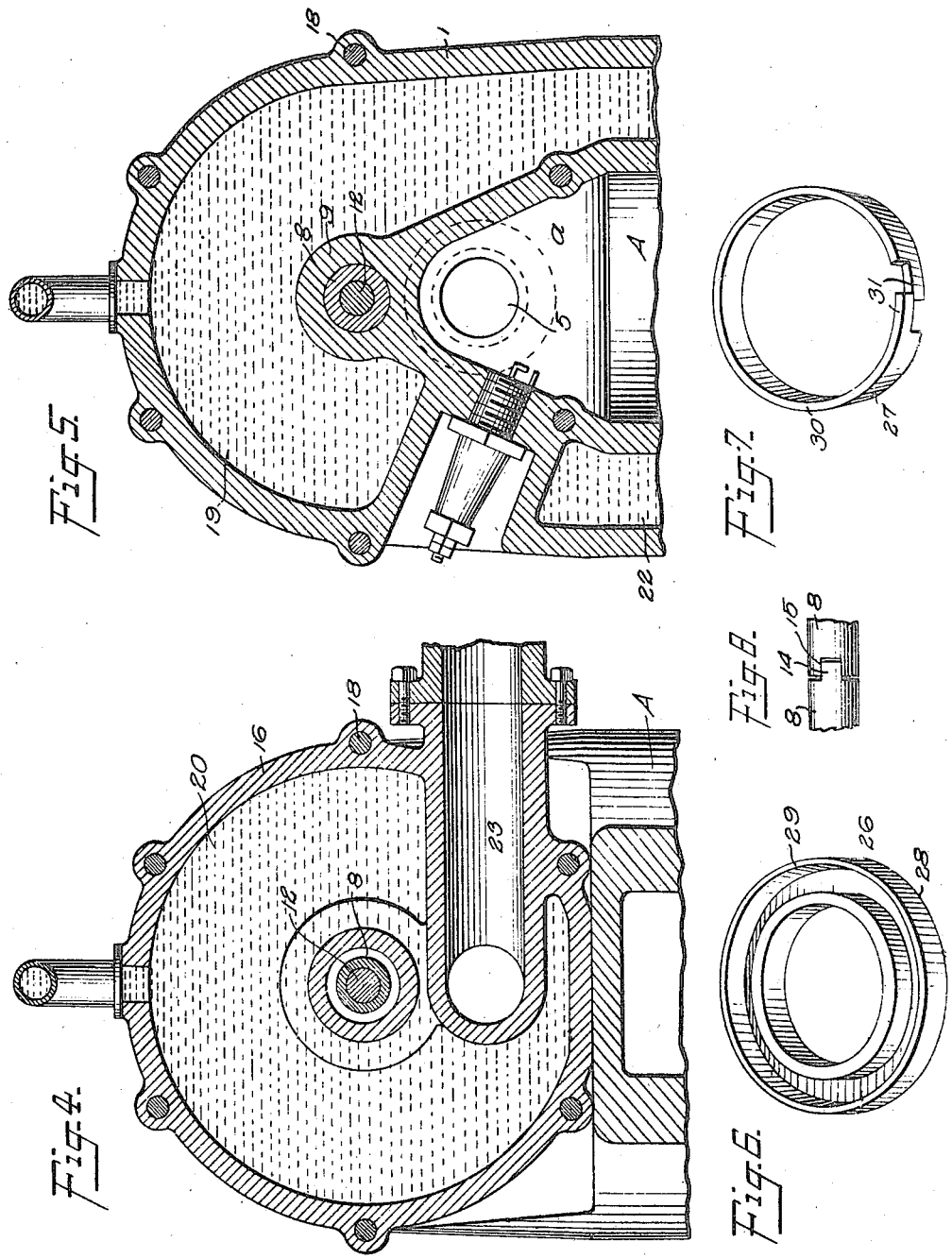

HARRY PERCIVAL STEVENS, OF NEW YORK, N. Y.

ROTARY VALVE FOR GAS-ENGINES.

1,249,235.  Specification of Letters Patent.  Patented Dec. 4, 1917.

Application filed July 10, 1915. Serial No. 39,102.

*To all whom it may concern:*

Be it known that I, HARRY P. STEVENS, a citizen of the United States, and a resident of the city of New York, borough of Manhattan, in the county and State of New York, have invented a new and Improved Rotary Valve for Gas-Engines, of which the following is a full, clear, and exact description.

This invention relates to internal combustion engines, and deals more particularly with a valve mechanism therefor.

The general object of the present invention is to improve and simplify the construction and operation of the inlet and exhaust valves so as to be reliable and efficient in use, comparatively simple and inexpensive to manufacture, and so designed as to insure noiseless running and avoidance of the valve troubles in the common forms of valves.

A more specific object of the invention is the provision of a pair of rotary valve disks arranged at opposite sides of the head of a cylinder and connected with a single shaft so as to open and close the inlet and exhaust ports in the proper sequence for the cycle of operation, there being effective packing means between the valves and the head of the cylinder so as to prevent the escape of gas.

Another important object of the invention is a novel arrangement of valve disks on which the gas in the cylinder exerts equal opposing pressures so that end thrust is equalized, wear minimized, lubrication difficulties eliminated, and easy running insured.

A further object of the invention is the provision of an improved form of cylinder head construction especially adapted for use in connection with the disk valves and capable of adaptation to multiple cylinder engines.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a fragmentary view of a multiple cylinder engine with one cylinder unit in section to illustrate the details of construction;

Fig. 2 is a section on the line 2—2, Fig. 1, to show the inlet valve;

Fig. 3 is a section on the line 3—3, Fig. 1, to show the exhaust valve;

Figs. 4 and 5 are sectional views on the lines 4—4 and 5—5, respectively, Fig. 1;

Fig. 6 is a perspective view of one part of a valve packing;

Fig. 7 is a perspective view of the other part of the valve packing; and

Fig. 8 is a detail view of a coupling means between the valves of adjacent cylinders.

Referring to the drawing, A designates the respective cylinders of the engine, each cylinder being provided with a head 1 that has two opposite flat surfaces or walls 2 and 3 between which is formed a chamber *a* that is in open communication with the interior of the cylinder A, and the walls 2 and 3 have alining circular inlet and exhaust ports 4 and 5, respectively. At the opposite sides of the head are rotary disk valves 6 and 7 which are keyed to a sleeve or tubular shaft 8 that passes through a bearing 9 in the head, the axis of the shaft being transverse to the axis of the cylinder. The valves are held in place by clamping nuts 10 which are screwed on the tubular shaft 8. In the valves 6 and 7 are ports 6' and 7', respectively, which, as shown in Figs. 2 and 3, are angularly spaced about ninety degrees more or less, so that the inlet port will open on the stroke succeeding the exhaust stroke of the piston. The shaft 8, may be driven in any suitable manner, as, for instance, by a sprocket wheel 11, that is connected by a chain with the engine shaft or some intermediate means. In case of a multiple engine a solid shaft 12 will extend through all the tubular valve shafts 8 to support and aline the same, the ends of the solid shaft 9 being disposed in bearing brackets 13 fastened to the outermost cylinders. The ports in the valves are so shaped that there will be a quick opening or closing of the ports, because the end walls of the ports in the valves are reëntrant on radii approximating the radius of the ports in the cylinder walls, as will be clearly seen from Figs. 2 and 3.

The tubular shafts 8 of adjacent cylinders are detachably connected together so that they will rotate as a unit. A simple form of coupling means is shown in Figs. 1 and 8, wherein one tubular shaft 8 has longitudinally extending tongues or lugs 14 at one end which engage in correspondingly shaped recesses 15 of the adjacent shaft 8, so that the shafts will be connected or disconnected by relative longitudinal movement, but they are keyed together for simultaneous rotation. In the present instance the head proper of each cylinder is made of a central section 1 and laterally shaped sections 16 and 17 at the inlet and exhaust sides of the head. These various sections are fastened together by bolts 18. The sections 16 and 17 are chambered to receive the valves 6 and 7, and the sections 1, 16 and 17 of the head structure are cored out with chambers 19, 20 and 21 for the circulation of cooling water, the chamber 19 of the section 1 being in communication with the water jacket 22 of the cylinder A. The head section 16 is provided with a conduit 23 which has one end registering with the port 4 so that the fuel charge can be admitted to the explosion chamber $a$ when the port 6' of the inlet valve alines with the port 4. The head section 17 has an exhaust passage 24 which is adapted to communicate with the exhaust port 5 through the port 7' of the valve 7.

It is essential that gas-tight joints be maintained at the points between the ports 4 and 5 and the valves 6 and 7. For this purpose the walls 1 and 2 are formed with circular grooves 25 concentric with the ports 4 and 5, respectively, and in these grooves are packings which bear against the valves 6 and 7. Each packing consists of a non-expansive valve-engaging ring 26 and an expansion and wedging ring 27. The ring 26 has an outer or front face 28 which bears against the associated valve, and the back of the ring is provided with a flange 29 which is internally beveled so as to be engaged by the expansion ring 27, which is of frusto-conical form, whereby the expansive tendency of the ring 27 will cause the rings 26 and 27 to be forced in opposite directions, with the flat face 28 pressed against the valve and the edge 30 of the ring 27 pressed against the bottom of the groove 25. The ring 27 is split so as to provide for circumferential expansion, the adjacent ends 31 formed by the split being in overlapping contact, as shown in Fig. 7, so as to prevent the escape of gas. By reason of the frusto-conical shape of the flange 29 of the ring 26, and the frusto conical external form of the ring 27, the latter tends to move out of the ring and thereby forms an effective yet yielding wedging action for maintaining the parts of the packing ring in sealing engagement with the valve.

It will be observed that the ports 4 and 5 are of equal size so that the same areas of the valves 6 and 7 will be exposed to the pressure of the gas in the cylinder and consequently end thrust of the valve structure is eliminated. This prevents undue wear and obviates valve grinding, insures easy running and renders lubrication of the valves a simple matter.

From the foregoing description taken in connection with the accompanying drawings, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as fall within the scope of the appended claims.

Having thus described my invention, I claim as new and desire to secure by Letters Patent:

1. The combination of a plurality of cylinders, a head structure on each cylinder having a combustion chamber, disk valves controlling the admission of fuel to and the discharge of exhaust gases from the said chamber, a tubular shaft connecting together the valves in the head structure of each cylinder, a single shaft extending through all the tubular shafts for supporting and holding them in alinement, and interlocking means between adjacent tubular shafts, said means being engaged and disengaged by relative longitudinal movement of the shafts and normally serving to connect the tubular shafts together to turn as a unit.

2. The combination of an engine cylinder, a head thereon having a ported wall, a rotary valve in proximity to the wall and having a port adapted to periodically register with the port of the wall, said wall having a circular channel surrounding the port, and a packing disposed in the channel and bearing against the valve, said packing comprising a non-expansive ring having a flange provided with a frusto-conical annular internal surface, and a split inexpansive ring having a frusto conical external surface engaging the internal surface of the flange, whereby the expansive force of the second ring forces the rings apart, with the first against the valve and the latter against the bottom of the channel.

3. A packing of the class described comprising a non-expansive ring having an annular flange on its rear side, said flange being provided with an internal frusto conical surface, and an expansive ring normally of larger diameter than the flange and provided with a frusto-conical external surface to engage the frusto-conical surface of the first ring, and the ends of the expansive ring being overlapped.

In testimony whereof I have signed my name to this specification in the presence of two subscribing witnesses.

HARRY PERCIVAL STEVENS.

Witnesses:
EDWARD A. EATON,
FREDERICK P. BIGGERMAN.